United States Patent [19]
St. Julien et al.

[11] Patent Number: 5,897,915
[45] Date of Patent: Apr. 27, 1999

[54] COATED SUBSTRATES, METHOD FOR PRODUCING SAME, AND USE THEREFOR

[75] Inventors: Dell J. St. Julien, Watkins Glen; Yuming Xie, Painted Post, both of N.Y.

[73] Assignee: Corning Incorporated, Corning, N.Y.

[21] Appl. No.: 08/953,446

[22] Filed: Oct. 17, 1997

Related U.S. Application Data

[60] Provisional application No. 60/029,644, Oct. 28, 1996.

[51] Int. Cl.$^6$ .............................. B05D 7/22; B05D 3/02; C01B 31/00
[52] U.S. Cl. .......................... 427/238; 427/228; 427/239; 427/375; 427/379; 264/29.1
[58] Field of Search .................................... 427/228, 238, 427/239, 244, 245, 377, 375, 224, 171; 264/29.1; 428/116

[56] References Cited

U.S. PATENT DOCUMENTS

| | | | |
|---|---|---|---|
| 3,676,173 | 7/1972 | Adams | 427/244 |
| 3,755,204 | 8/1973 | Sergeys | 428/116 |
| 3,919,379 | 11/1975 | Smarook | 428/116 |
| 3,922,412 | 11/1975 | Yoshikawa et al. | 428/116 |
| 3,996,967 | 12/1976 | Takada et al. | 427/238 |
| 4,088,576 | 5/1978 | Mott | 427/238 |
| 4,089,998 | 5/1978 | Gibson | 427/238 |
| 4,268,333 | 5/1981 | Schwarz | 156/161 |
| 4,758,272 | 7/1988 | Pierotti et al. | 75/246 |
| 4,919,860 | 4/1990 | Schindler et al. | 264/29.1 |
| 4,992,233 | 2/1991 | Swaroop et al. | 419/2 |
| 5,104,425 | 4/1992 | Rao et al. | 55/16 |
| 5,165,970 | 11/1992 | Schmidt et al. | 427/238 |
| 5,205,886 | 4/1993 | White | 427/238 |
| 5,427,601 | 6/1995 | Harada et al. | 75/235 |
| 5,474,681 | 12/1995 | Fehlner et al. | 210/500.25 |
| 5,648,027 | 7/1997 | Tajiri et al. | 264/29.1 |

FOREIGN PATENT DOCUMENTS

| | | |
|---|---|---|
| 428052 A2 | 5/1991 | European Pat. Off. . |
| 575945 A2 | 12/1993 | European Pat. Off. . |
| 2575398 | 7/1986 | France . |
| 2342133 | 3/1974 | Germany . |
| 53-16373 | 2/1978 | Japan . |
| 3-60713 | 3/1991 | Japan . |
| 4-326930 | 11/1992 | Japan . |
| 7-24743 | 3/1995 | Japan . |

*Primary Examiner*—Diana Dudash
*Attorney, Agent, or Firm*—L. Rita Herzfeld

[57] ABSTRACT

A membrane-coated substrate and method for forming the membrane coating on the substrate that involves providing a porous inorganic monolithic substrate having one or more through channels having inner surfaces, providing solid polymeric film fusible to the substrate, and joining the film to the substrate by applying the film in a softened state to those inner surfaces and applying pressure thereto, so that the film fuses to and coats the inner surfaces of the channels. A workstream is modified by passing it through the membrane-coated substrate to cause modification of the workstream by the membrane coating.

8 Claims, No Drawings

COATED SUBSTRATES, METHOD FOR PRODUCING SAME, AND USE THEREFOR

This application claims the benefit of U.S. Provisional Application Ser. No. 60/029,644, filed Oct. 28, 1996, entitled Coated Substrates, Method for Producing Same, and Use Therefor, by Dell J. St. Julien and Yuming Xie.

This invention relates to methods for producing a coating on a substrate that involve first applying and fusing a solid film of a polymeric substance to the substrate, followed optionally by heating-treating. The polymeric material is preferably a carbon precursor.

BACKGROUND OF THE INVENTION

Porous carbon materials are widely used as adsorbents, catalyst supports, and filtration membranes due to their high surface area and well defined porosity. Nano-porous carbon membranes have been recently developed for gas separation through a Selective Surface Flow (SSF) mechanism. Such materials are disclosed in U.S. Pat. No. 5,104,425.

According to U.S. Pat. No. 5,104,425 the carbon membrane is made by pyrolysis of poly(vinylidene chloride-methyl methacrylate-acrylic acid-methyl acrylate) co-polymer (PVDC latex) films pre-coated on mesoporous substrates (either tubes or honeycomb matrices) under nitrogen. In the coating process, well dispersed latex particles (average diameter around 0.1 micron) in water are slip-cast on the porous substrates. In the slip-casting process, the liquid from the latex dispersion passes into the pores of the substrate while the dispersed latex is effectively filtered out by the narrowness of the pore openings and is deposited as a coating on the substrate channel surface. After drying, the well-packed latex particles on the surface are fused by heating to form a continuous polymer film and then convert to a flaw-free carbon membrane by further heating at higher temperatures. If the pores in the substrate (0.4–0.8 micron) are much larger than the latex particles, it is inevitable that latex particles go in the mesopores of the substrates during slip-casting. This may be highly undesirable since the microfiltration of polymer latex particles causes narrowing of the egress path, hence increasing the resistivity for gases passing through the matrices. As a remedy to this problem, a support layer is applied to substrate which has a pore size smaller than that of the substrate but larger than that of the membrane to be formed. Therefore, without use of the intermediate size support layer, larger pore size substrates cannot be used to hold membranes.

Another problem with the current state of the art slip cast coating process is the difficulty of controlling both coating thickness and uniformity for high channel density honeycomb matrices. As the channel density is increased, the volume of mesopores in the substrate per unit surface area of membrane decreases, and hence the volume of PVDC latex dispersion which can be slip-cast onto the channel surfaces decreases. Once the pores are entirely filled, little or no additional coating takes place and the already deposited coating may begin to slough off or re-disperse. Therefore, it is difficult to form high quality, flaw-free membranes on high channel density honeycomb matrices.

With geometrically complex honeycomb matrices having high channel density, egress path is an issue. To maximize the membrane efficiency, large mesopores are preferred in the substrate. In general, substrates with large pores have rough surfaces which are difficult to coat, affecting the slip-cast coating procedure and the quality of the carbon membrane as well.

There are other difficulties with the slip-cast coating method. The compatibility of substrate materials with the highly acidic dispersion is one problem. Basic materials may partially dissolve in the coating process. Dispersion corrosiveness and waste solution disposal are other problems.

It would be highly desirable and an advancement in the art to produce a coating on the substrate without the above problems.

SUMMARY OF THE INVENTION

In accordance with one aspect of the invention, there is provided a membrane-coated substrate.

In accordance with another aspect of the invention, there is provided a method for forming the membrane coating on the substrate that involves providing a porous inorganic monolithic substrate having one or more through channels having inner surfaces, providing solid polymeric film fusible to the substrate, and joining the film to the substrate by applying the film in a softened state to those inner surfaces and applying pressure thereto, so that the film fuses to and coats the inner surfaces of the channels.

In accordance with another aspect of the invention, there is provided a method for modifying a workstream by passing the workstream through the above-described membrane-coated substrate to cause modification of the workstream by the membrane coating.

DETAILED DESCRIPTION OF THE INVENTION

The present invention relates to a method for coating a substrate by joining a solid polymeric coating material to a substrate having one or more through channels. The polymeric material can be heat-treated.

The coated substrate so formed is useful for applications such as gas separation, liquid separation, microfiltration, and adsorptions.

The Coating Material

The coating material is a polymeric material that is applied to the inner surfaces of the substrate channels as a film, preferably a thin film. By thin film is meant a thickness of typically up to about 150 micrometers, preferably about 5 to 100 micrometers, and most preferably about 5 to 30 micrometers.

Some especially useful polymeric coating materials are poly(vinylidene chloride-methyl methacrylate-acrylic acid-methyl acrylate) co-polymer, polyvinyl chlorides, polysulfones, acrylic polymers, polymers containing styrene, polymers containing styrenic acid, polymers containing styrene and divinyl benzene, polyamides, polyimides, polynitriles, and combinations of these. One especially useful coating material is a carbon precursor that converts to carbon on heat-treating. Other polymeric materials are those that yield silica, e.g. silicon resins such as polysiloxanes, alumina, etc. Also useful as polymeric coating materials are other polymers which can function as membranes or adsorbers, or which can be converted to porous membranes or adsorbers by chemical or heat treatment, or treatment with UV light, alpha particle bombardment, or other methods useful for forming membranes of the desired porosity or adsorptivity. Such polymers can include fillers such as inorganic particles.

The coating material that is to form the film, can take the form of sheets, tubes, or hollow spheres. The films can be formed by hot pressing, tape casting, injection molding, blow molding, extrusion, or other polymeric film forming methods. However, a tubular shape is the most advantageous because such a shape more easily conforms to the inner surfaces of the substrate channels.

The Substrate

The substrate must have high strength, be chemically inert especially to the coating material. The porosity and pore sizes can vary depending on that desired in the final coated substrate product. Typically, the total porosity can be about 5% to 70% and more typically about 10% to 60% while the average pore diameter is typically up to about 50 micrometers, preferably up to about 5 micrometers and more preferably up to about 2 micrometers.

In general the substrate is a monolithic flow through body of any size and shape depending on the application. The shape can range from relatively simple such as tubes or bundles of tubes to more complex bodies such as multicellular structures such as honeycombs. The invention is especially suited for high cell density thin-walled honeycomb structures having typically $7.5$ cells/cm.$^2$ ($50$ cells/in.$^2$). Filter devices e.g. ceramic filters are especially suited.

Some especially suited substrate materials are ceramic, glass ceramic, glass, metal, and combinations thereof. By combinations is meant physical or chemical combinations, e.g., mixtures, compounds, or composites. Molecular sieves, e.g. zeolites are also suitable substrate materials.

Some materials that are especially suited to the practice of the present invention, although it is to be understood that the invention is not limited to such, are those made of cordierite, mullite, clay, talc, zircon, zirconia, zirconates, zirconia-spinel, zeolites, magnesium alumino-silicates, spinel, alumina, silica, silicates, borides, alumino-silicates, e.g., porcelains, lithium aluminosilicates, alumina silica, feldspar, titania, fused silica, nitrides, borides, carbides, e.g., silicon carbide, silicon nitride, or mixtures of these. Especially useful materials are cordierite and/or mullite. Mullite is preferred because of its strength and economy.

The invention is suitable for use with metal substrates. These substrates can be made of any sinterable metal or metal composition. Especially suited are iron group metal, chromium, and aluminum compositions, with the preferred iron group metal being iron. Especially preferred is Fe, Al, and Cr. For example, Fe5-20Al5-40Cr, and Fe7-10Al10-20Cr powders with other possible additions are especially suited. Some typical compositions of metal powders are disclosed in U.S. Pat. Nos. 4,992,233, 4,758,272, and 5,427,601 which are herein incorporated by reference as filed. U.S. Pat. No. 4,992,233 relates to methods of producing porous sintered bodies made from metal powder compositions of Fe and Al with optional additions of Sn, Cu, and Cr,. U.S. Pat. No. 5,427,601 relates to porous sintered bodies having a composition consisting essentially of in percent by weight about 5 to about 40 chromium, about 2 to about 30 aluminum, 0 to about 5 of special metal, 0 to about 4 of rare earth oxide additive and the balance being iron group metal, and unavoidable impurities such as e.g., Mn or Mo, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanides, Zr, Hf, Ti, Si, and B, with optional additions of alkaline earths, Cu, and Sn.

The polymer films can be inserted into porous tubular substrates or extruded honeycombs and other multichannel substrates, and fused. Insertion can be performed mechanically or by blowing, using air or other fluids.

Fusion or joining of the film to the substrate inner channels can be accomplished by any technique that allows the film to soften or be in a softened state, and render it in an adhesive state for bonding with some applied pressure. For example, coating material and/or substrate can be heated to soften the polymer film to cause fusion. Convection, conduction, and radiative transfer can be employed. Or film with a low glass transition temperature that is sufficiently tacky to bond with the substrate at room temperature can be used. Alternately, a solvent can be used to soften the polymeric material in preparation for fusing to the substrate.

The present invention offers significant advantages over state-of-the-art slip casting processes. There is more flexibility in the type of substrates that can be used. For example, because the membrane film remains fixed onto the coating surface of the substrate and membrane material does not permeate into the inner porosity, highly permeable or larger pore size substrates than can be used with conventional techniques. Because there is essentially no deposition of membrane material in the substrates mesopores, the diffusivities of the gaseous species is increased. The quality of a nano-porous membrane depends on the quality of polymer precursors and the quality of polymer films or tubes can be well controlled. The quality of a membrane is independent of the substrate's properties. Highly porous substrates and substrates with high surface roughness can be used. High channel density substrates can be used to support the membranes to improve membrane efficiency. The process can be easily controlled to produce consistent product quality. Dispersion induced corrosion and environmental problems are eliminated. Because the fusing mechanism of this invention is physical, there are no chemical incompatibility problems.

To more fully illustrate the invention, the following non-limiting examples are presented. All parts, portions, and percentages are on a weight basis unless otherwise stated.

EXAMPLE 1

Pre-formed poly(vinylidene chloride-methylethacrylate-acrylic acid-methyl acrylate) tubes are used as precursors for forming nano-porous carbon membranes on porous ceramic substrates. The slightly less than 2.54 mm (0.1") diameter, 0.05–0.13 mm (0.002–0.005") thick polymer tubes are formed by extruding 1.27 cm. (0.5") diameter tubes at a suitable temperature, between 100° C. and 210° C., and drawing down. The tubes are inserted into porous mullite substrates with a multiplicity of 2.54 mm (0.1") diameter channels. After insertion, the tubes are inflated to bring them in contact with the channel walls and heated to fuse them to the substrates. The fused tubes are further heated to convert the PVDC latex into a porous carbon membrane.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for forming a membrane coating on a substrate, the method comprising:

a) providing a porous inorganic monolithic substrate having one or more through channels having inner surfaces;

b) providing solid polymeric film fusible to the substrate;

c) joining the film to the substrate by applying said film in a softened state to said inner surfaces of said substrate and applying pressure thereto, so that the film fuses to and coats said inner surfaces of said channels.

2. A method of claim 1 wherein the polymeric material is selected from the group consisting of poly(vinylidene chloride- methyl methacrylate-acrylic acid-methyl acrylate) co-polymer, polyvinyl chlorides, polysulfones, acrylic polymers, polymers containing styrene, polymers containing styrenic acid, polymers containing styrene and divinyl benzene, polynitriles, silicone resins, and combinations thereof.

3. A method of claim 1 wherein the polymeric material is a carbon precursor.

4. A method of claim 3 wherein the film coating is heat-treated to convert the polymeric material to carbon.

5. A method of claim 1 wherein the substrate is made of material selected from the group consisting of ceramic, glass, glass ceramic, metal, molecular sieve, and combinations thereof.

6. A method of claim 1 wherein the softening is carried out by a method selected from the group consisting of heating said film, and applying a solvent to said film and said inner surface of said channels.

7. A method for forming a membrane coating on a substrate, the method comprising:
   a) providing a porous inorganic monolithic multi channel substrate;
   b) providing poly((vinylidene chloride-methyl methacrylate-acrylic acid-methyl acrylate) tubes;
   c) inserting said tubes into the channels of said substrate and inflating said tubes to bring said tubes in contact with the substrate channel surfaces and heating said tubes to fuse said tubes thereto; and
   d) heat-treating the fused tubes from step c to convert said tubes to a porous carbon membrane adhering to the inner surfaces of said substrate channels.

8. A method of claim 7 wherein the substrate is made of mullite.

* * * * *